(12) United States Patent
Zhang et al.

(10) Patent No.: US 10,535,891 B2
(45) Date of Patent: Jan. 14, 2020

(54) TWO-ELECTRON REDOX CATHOLYTE FOR REDOX FLOW BATTERIES

(71) Applicant: UChicago Argonne, LLC, Chicago, IL (US)

(72) Inventors: Jingjing Zhang, Willowbrook, IL (US); Lu Zhang, Lisle, IL (US); Ilya A. Shkrob, Chicago, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 252 days.

(21) Appl. No.: 15/675,015

(22) Filed: Aug. 11, 2017

(65) Prior Publication Data

US 2019/0051921 A1    Feb. 14, 2019

(51) Int. Cl.
*H01M 8/18* (2006.01)
*H01M 8/02* (2016.01)

(52) U.S. Cl.
CPC ............. *H01M 8/188* (2013.01); *H01M 8/02* (2013.01); *H01M 2300/0025* (2013.01); *H01M 2300/0037* (2013.01); *H01M 2300/0045* (2013.01)

(58) Field of Classification Search
CPC .................. H01M 8/188; H01M 8/02; H01M 2300/0025; H01M 2300/0037; H01M 2300/0045
See application file for complete search history.

(56) References Cited

U.S. PATENT DOCUMENTS

2014/0302386 A1    10/2014    Gaubicher et al.
2017/0062863 A1    3/2017    Huang et al.

FOREIGN PATENT DOCUMENTS

WO    WO-2012/153067 A1    11/2012

*Primary Examiner* — Stephen J Yanchuk
(74) *Attorney, Agent, or Firm* — Foley & Lardner LLP

(57) ABSTRACT

A redox flow battery comprising a two-electron, redox active, bridged, multi-cyclic compound ("TRBMC") comprises a non-aromatic, bridged cyclic portion fused to an aromatic cyclic portion.

17 Claims, 6 Drawing Sheets

TWO-ELECTRON REDOX CATHOLYTE FOR REDOX FLOW BATTERIES

GOVERNMENT RIGHTS

The United States Government has rights in this invention pursuant to Contract No. DE-AC02-06CH11357 between the U.S. Department of Energy and UChicago Argonne, LLC, representing Argonne National Laboratory.

FIELD

This technology relates to redox flow batteries ("RFBs"). More particularly, this technology relates to non-aqueous cation-based redox flow batteries utilizing organic redox materials.

SUMMARY

In a first aspect, a redox flow battery is provided that includes a two-electron, redox active, bridged, multi-cyclic compound (TRBMC) comprises a non-aromatic, bridged cyclic moiety fused to an aromatic cyclic moiety. In some embodiments, the TRBMC may include an annulated anthracene ether compound. In some embodiments, the TRBMC may include a compound represented by Formula I:

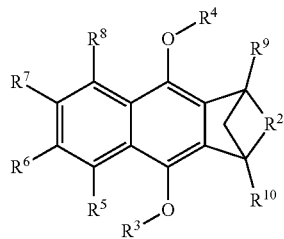

wherein: $R^2$ may be a bond or alkylene; $R^3$ and $R^4$ may be individually H, alkyl, haloalkyl, phosphate, $-[(CH_2)_n-O]_{n'}-R^{11}$; $R^5$, $R^6$, $R^7$, and $R^8$ may be individually H, alkyl, haloalkyl, alkenyl, F, Cl, Br, I, $NO_2$, CN, $-[(CH_2)_n-O]_{n'}-R^{11}$, aryl, aralkyl, or where any two may join together to form an aromatic or non-aromatic fused ring; $R^9$ and $R^{10}$ may be individually H, alkyl, F, Cl, Br, I, $NO_2$, CN, aryl, or aralkyl; each $R^{11}$ may be individually H, alkyl, aryl, or aralkyl; n may be an integer from 0 to 25; and n' may be an integer from 0 to 25.

In some embodiments, $R^2$ may be $C_1$-$C_4$-alkylene. In some embodiments, $R^2$ may be methylene, ethylene, n-propylene, or iso-propylene. In some embodiments, $R^2$ may be ethylene. In some embodiments, $R^3$ and $R^4$ may be individually H, alkyl, or $-[(CH_2)_n-O]_{n'}-R^{11}$. In some embodiments, $R^5$, $R^6$, $R^7$, and $R^8$ may be individually H or alkyl, or where any two may join together to form a ring. In some embodiments, $R^9$ and $R^{10}$ may be individually H or alkyl. In some embodiments, each $R^{11}$ may be individually H or alkyl. In some embodiments, n may be an integer from 1 to 10; and n' may be an integer from 1 to 10. In some embodiments, $R^2$ may be methylene or ethylene; $R^3$ and $R^4$ may be individually H, alkyl, or $-[(CH_2)_n-O]_{n'}-R^{11}$; $R^5$, $R^6$, $R^7$, and $R^8$ may be individually H; $R^9$ and $R^{10}$ may be individually H, methyl, ethyl, n-propyl, iso-propyl, n-butyl, sec-butyl, iso-butyl, or tert-butyl; each $R^{11}$ may be individually H or alkyl; n may be an integer from 1 to 10; and n' may be an integer from 1 to 10. In some embodiments, the TRBMC may include 9,10-bis(2-methoxyethoxy)-1,2,3,4-tetrahydro-1,4-methanoanthracene. In some embodiments, the redox flow battery may be non-aqueous.

In a second aspect, a method is provided for operating a redox flow battery, the method includes providing a redox flow battery having a catholyte that includes a two-electron, redox active, bridged, multi-cyclic compound (TRBMC) having a non-aromatic, bridged cyclic moiety fused to an aromatic cyclic moiety.

DETAILED DESCRIPTION

Figure 1:
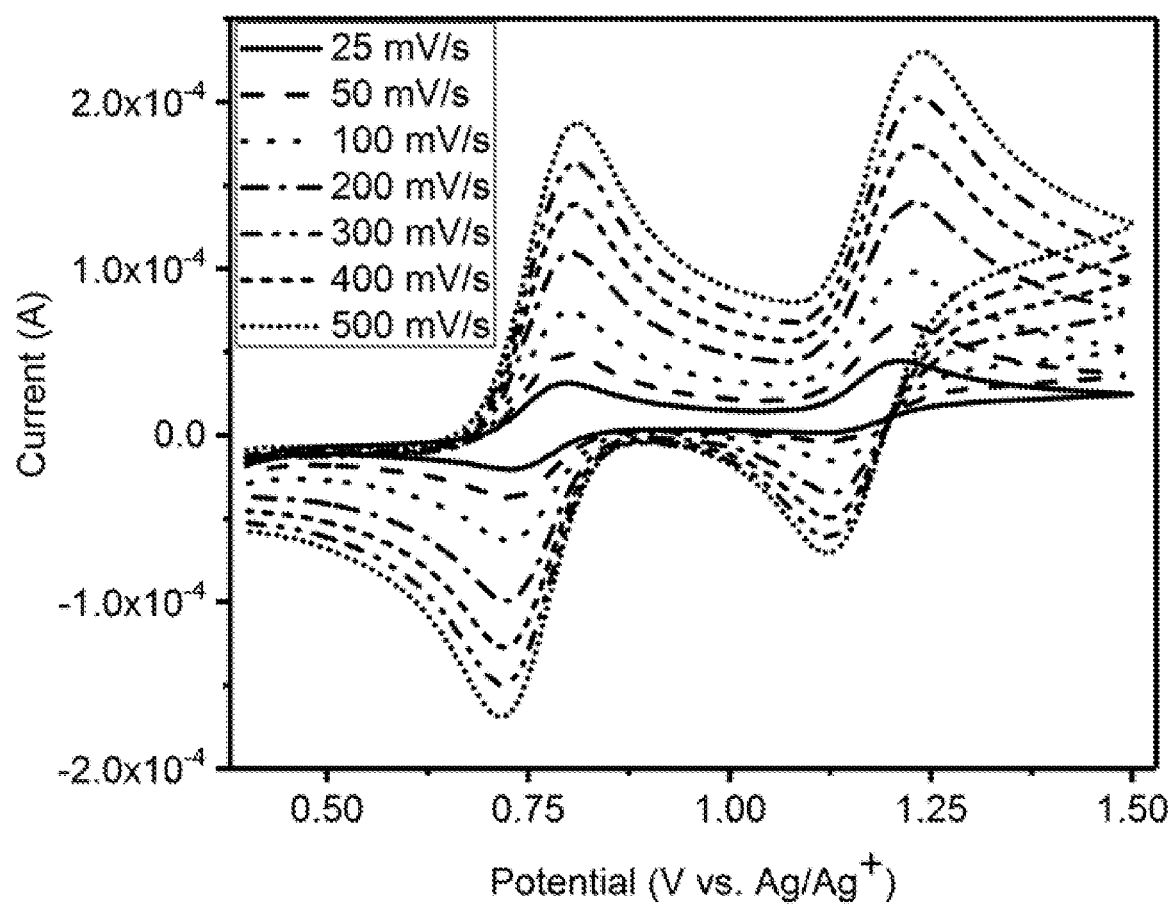
FIG. 1 illustrates CV scans for DMB-11 in 0.5 M $TBAPF_6$ in acetonitrile at various scan rates, according to the examples.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group. Examples include a partial- or per-fluoroalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, CH—CH=CH$_2$, C=CH$_2$, or C=CHCH$_3$.

As used herein, "aryl" or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

Heteroalkyl group include straight and branched chain alkyl groups as defined above and further include 1, 2, 3, 4, 5, or 6 heteroatoms independently selected from oxygen, sulfur, and nitrogen. Thus, heteroalkyl groups include 1 to 12 carbon atoms, 1 to 10 carbons or, in some embodiments, from 1 to 8, or 1, 2, 3, 4, 5, or 6 carbon atoms, or any range therein (e.g., 1-4). Examples of heteroalkyl groups include, but are not limited to, —(CH$_2$CH$_2$O)$_{1-5}$CH$_3$, —(CH$_2$)$_{1-6}$O (CH$_2$)$_{1-6}$CH$_3$, —(CH$_2$)$_{1-6}$NR$_a$(CH$_2$)$_{1-6}$CH$_3$, —(CH$_2$)$_{1-6}$S (CH$_2$)$_{1-6}$CH$_3$, —(CH$_2$)$_{1-6}$O(CH$_2$)$_{1-6}$O(CH$_2$)$_{1-6}$CH$_3$, —(CH$_2$)$_{1-6}$NR$_a$(CH$_2$)$_{1-6}$NR$_a$(CH$_2$)$_{1-6}$CH$_3$, —(CH$_2$)$_{1-6}$O (CH$_2$)$_{1-6}$O(CH$_2$)$_{1-6}$O(CH$_2$)$_{1-6}$CH$_3$, —(CH$_2$)$_{1-6}$NR$_a$ (CH$_2$)$_{1-6}$NR$_a$(CH$_2$)$_{1-6}$NR$_a$(CH$_2$)$_{1-6}$CH$_3$, with the total number of carbon atoms in the heteroalkyl group being 1 to 12 and R$^a$ is a hydrogen or a substituted or unsubstituted alkyl, alkenyl, aryl or aralkyl group. Other examples of heteroalkyl groups include, but are not limited to, groups having different heteroatoms in a single group. Such examples of heteroalkyl groups include, but are not limited to, —(CH$_2$)$_{1-6}$S(CH$_2$)$_{1-6}$O(CH$_2$)$_{1-6}$, —(CH$_2$)$_{1-6}$NR$_a$(CH$_2$)$_{1-6}$)O (CH$_2$)$_{1-6}$, —(CH$_2$)$_{1-6}$O(CH$_2$)$_{1-6}$NR$_a$(CH$_2$)$_{1-6}$S(CH$_2$)$_{1-6}$, —(CH$_2$)$_{1-6}$NR$_a$(CH$_2$)$_{1-6}$O(CH$_2$)$_{1-6}$S(CH$_2$)$_{1-6}$, with the total number of carbon atoms in the heteroalkyl group being 1 to 12. In some embodiments, heteroalkyl groups include, but are not limited to, polyoxyethylene groups, such as —(OCH$_2$CH$_2$)$_{0-6}$OCH$_3$ or —(OCH$_2$CH$_2$)$_{0-6}$OCH$_2$CH$_3$.

Aralkyl groups are substituted aryl groups in which an alkyl group as defined above has a hydrogen or carbon bond of the alkyl group replaced with a bond to an aryl group as defined above. In some embodiments, aralkyl groups contain 7 to 14 carbon atoms, 7 to 10 carbon atoms, e.g., 7, 8, 9, or 10 carbon atoms or any range therein (e.g., 7-8). Aralkyl groups may be substituted or unsubstituted. Substituted aralkyl groups may be substituted at the alkyl, the aryl or both the alkyl and aryl portions of the group. Representative substituted and unsubstituted alkaryl groups include but are not limited to alkylphenyl such as methylphenyl, (chloromethyl)phenyl, chloro(chloromethyl)phenyl, or fused alkaryl groups such as 5-ethylnaphthalenyl.

Heterocyclyl groups are non-aromatic ring compounds containing 3 or more ring members, of which one or more is a heteroatom such as, but not limited to, N, O, and S. In some embodiments, the heterocyclyl group contains 1, 2, 3 or 4 heteroatoms. In some embodiments, heterocyclyl groups include mono-, bi- and tricyclic rings having 3 to 16 ring members, whereas other such groups have 3 to 6, 3 to 10, 3 to 12, or 3 to 14 ring members. Heterocyclyl groups encompass partially unsaturated and saturated ring systems, such as, for example, imidazolinyl and imidazolidinyl groups. The phrase also includes bridged polycyclic ring systems containing a heteroatom such as, but not limited to, quinuclidyl. The phrase also includes heterocyclyl groups that have other groups, such as alkyl, oxo or halo groups, bonded to one of the ring members, referred to as "substituted heterocyclyl groups". Heterocyclyl groups include, but are not limited to, aziridinyl, azetidinyl, pyrrolidinyl, imidazolidinyl, pyrazolidinyl, thiazolidinyl, tetrahydrothiophenyl, tetrahydrofuranyl, dioxolyl, pyrrolinyl, piperidyl, piperazinyl, morpholinyl, thiomorpholinyl, tetrahydropyranyl, and tetrahydrothiopyranyl groups. Representative substituted heterocyclyl groups may be mono-substituted or sub-stituted more than once, such as, but not limited to, morpholinyl groups, which are 2-, 3-, 4-, 5-, or 6-substituted, or disubstituted with various substituents such as those listed above. The heteroatom(s) may also be in oxidized form, if chemically possible.

Heteroaryl groups are aromatic ring compounds containing 5 or more ring members, of which, one or more is a heteroatom such as, but not limited to, N, O, and S. Heteroaryl groups include, but are not limited to, groups such as pyrrolyl, pyrazolyl, triazolyl, tetrazolyl, oxazolyl, isoxazolyl, thiazolyl, pyridinyl, pyridazinyl, pyrimidinyl, pyrazinyl, thiophenyl, benzothiophenyl, furanyl, imidazolyl, benzofuranyl, indolyl, azaindolyl (pyrrolopyridinyl), indazolyl, benzimidazolyl, imidazopyridinyl (azabenzimidazolyl), pyrazolopyridinyl, triazolopyridinyl, benzotriazolyl, benzoxazolyl, benzothiazolyl, benzothiadiazolyl, imidazopyridinyl, isoxazolopyridinyl, thianaphthyl, purinyl, xanthinyl, adeninyl, guaninyl, quinolinyl, isoquinolinyl, tetrahydroquinolinyl, quinoxalinyl, and quinazolinyl groups. Heteroaryl groups include fused ring compounds in which all rings are aromatic such as indolyl groups and include fused ring compounds in which only one of the rings is aromatic, such as 2,3-dihydro indolyl groups. The phrase "heteroaryl groups" includes fused ring compounds and also includes heteroaryl groups that have other groups bonded to one of the ring members, such as alkyl groups, referred to as "substituted heteroaryl groups." Representative substituted heteroaryl groups may be substituted one or more times with various substituents such as those listed above. The heteroatom(s) may also be in oxidized form, if chemically possible.

The term "halogen" or "halo" as used herein refers to bromine, chlorine, fluorine, or iodine. In some embodiments, the halogen is fluorine. In other embodiments, the halogen is chlorine or bromine. The term "halide" as used herein refers to the anion of a halogen, such as bromide, chloride, fluoride, and iodide. In some embodiments, the halide is chloride or iodide.

The terms "alkoxy" refers to a substituted or unsubstituted alkyl group bonded to an oxygen atom. Examples include but are not limited to methoxy and ethoxy. Representative substituted alkoxy groups may be substituted one or more times with substituents such as those listed above, such as methoxymethyl and fluoromethoxy.

The present technology provides for a non-aqueous redox flow battery based on oxidation and reduction of organic electroactive materials at the negative and positive electrodes and cation exchange involving transfer of cations such as alkali metal ions (e.g., lithium and sodium), and alkaline earth metal ions (e.g., magnesium and calcium) to balance charges resulting from the redox reactions. In particular, the present technology provides organic redox compounds that are capable of undergoing two or more reversible redox electron transfers. These compounds offer high capacity and high energy density compared to previously known organic redox materials.

The present technology relates to redox active compounds for inclusion in a catholyte of a redox flow battery, wherein the redox active compound includes an aromatic system and a non-aromatic, bicyclic system. Without being bound by theory, it is hypothesized that the aromatic systems help stabilize radical cations, while the non-aromatic, bicyclic system prevents or at least minimizes the potential for nucleophilic attack of the aromatic portion of the compounds. The compounds of the present technology have extended aromatic systems with additional conjugation, by incorporation of additional fused benzene rings. These molecules are capable of reversible two-electron transfer process, thus leading to high efficiency of molecular design and an increase in the overall energy density.

In one aspect, the technology is directed to non-aqueous redox flow batteries. In certain embodiments, the redox flow battery includes a negative electrode immersed in an anolyte, a positive electrode immersed in a catholyte, and a cation-permeable separator to allow cations to shuttle between the anolyte and the catholyte during charging and discharging. The negative electrode and positive electrode each act as current collectors.

The catholyte includes a two-electron, redox active, bridged, multi-cyclic compound (TRBMC). The TRBMC include a non-aromatic, bridged cyclic portion (i.e. "moiety") fused to an aromatic cyclic portion. According to some embodiments, the aromatic cyclic portion may include a benzene core group this is protected by the bridged cyclic portion. In some embodiments, the TRBMC is an annulated naphthalene. As used herein, the term "annulated" refers to a bridging of an otherwise aromatic ring, thereby disrupting the aromaticity of that group. Illustrative examples of the such include, but are not limited to, compounds represented by Formula I, or a combination of any two or more such compounds:

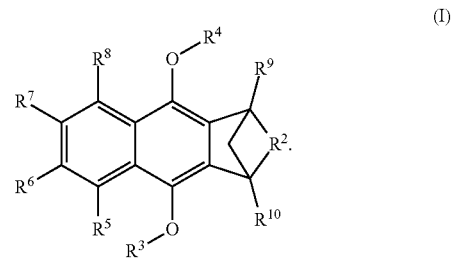

(I)

In Formula I, $R^2$ may be a bond or alkylene; $R^3$ and $R^4$ are individually H, alkyl, haloalkyl, phosphate, $-[(CH_2)_n-O]_{n'}-R^{11}$; $R^5$, $R^6$, $R^7$, and $R^8$ are individually H, alkyl, haloalkyl, alkenyl, F, Cl, Br, I, $NO_2$, CN, $-[(CH_2)_n-O]_{n'}-R^{11}$, aryl, or aralkyl, or where any two may join together to form an aromatic or non-aromatic fused ring; $R^9$ and $R^{10}$ are individually H, alkyl, F, Cl, Br, I, $NO_2$, CN, aryl, or aralkyl; and each $R^{11}$ is individually H, alkyl, aryl, or aralkyl. Additionally, in Formula I, n and n' are individually an integer from 0 to 25. In some embodiments, $R^2$ may be a $C_1$-$C_4$-alkylene. In some embodiments, $R^2$ may be methylene, ethylene, n-propylene, or iso-propylene. In some embodiments, $R^2$ may be ethylene.

In the compounds of Formula I, $R^3$ and $R^4$ may be individually H, alkyl, or $-[(CH_2)_n-O]_{n'}-R^{11}$. In any of the above embodiments, $R^5$, $R^6$, $R^7$, and $R^8$ may be individually H or alkyl, or where any two such groups may join together to form a fused ring.

In the compounds of Formula I, $R^9$ and $R^{10}$ may be individually H or alkyl. In any of the above embodiments, each may be individually H or alkyl. In any of the above embodiments, n may be an integer from 1 to 10; and n' may be an integer from 1 to 10.

In any of the above embodiments of the compounds of Formula I, $R^2$ may be methylene or ethylene; $R^3$ and $R^4$ may be individually H, alkyl, or —[($CH_2$)$_n$—O]$_{n'}$, $R^{11}$; $R^5$, $R^6$, $R^7$, and $R^8$ may be individually H; $R^9$ and $R^{10}$ may be individually H, methyl, ethyl, n-propyl, iso-propyl, n-butyl, sec-butyl, iso-butyl, or tert-butyl; each $R^{11}$ may be individually H or alkyl; n may be an integer from 1 to 10; and n' may be an integer from 1 to 10.

Illustrative compounds represented by Formula I may include, but are not limited to:

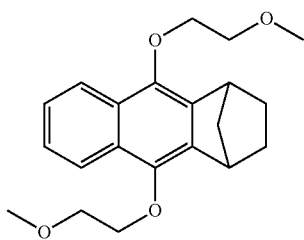

(9,10-bis(2-methoxyethoxy)-1,2,3,4-tetrahydro-1,4-methanoanthracene). The structure of DMB-12 (9,10-bis(2-methoxyethoxy)-1,2,3,4-tetrahydro-1,4-ethanoanthracene) is:

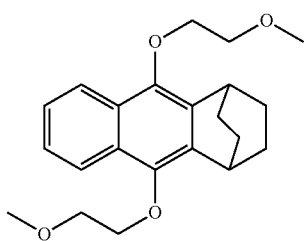

According to any of the above embodiments, the redox flow batteries described herein may be non-aqueous.

Without being bound by theory, it is hypothesized that the compounds of Formula I is capable of undergoing two reversible redox electron transfers. Therefore, the redox flow battery may be operated at a voltage sufficient to access the second electron redox couple of the compound of Formula I. The voltage at which the second electron redox couple is accessed will vary widely depending on the substitution of the core aromatic/non-aromatic portions of Formula I.

In some embodiments, the redox flow battery of the present technology includes a solvent. In certain embodiments, the solvent is an aprotic solvent. The solvent or solvents of the anolyte may be the same as the solvent or solvents of the catholyte, or the anolyte and catholyte may comprise different solvents. In some embodiments, the solvent includes organic carbonates (e.g., ethylene carbonate, propylene carbonate, ethyl methyl carbonate, and the like), ethers (e.g., diethyl ether, dimethyl ether, tetrahydrofuran, 2-methyl tetrahydrofuran, dimethoxyethane, diglyme, triglyme, and 1,3 dioxolane), esters (e.g., methyl formate, γ-butyrolactone, and methyl acetate), and nitriles (e.g., acetonitrile), or mixture of any two or more thereof. In particular embodiments, the solvent comprises ethylene carbonate (EC), propylene carbonate (PC), vinylene carbonate (VC), butylene carbonate (BC), dimethyl carbonate (DMC), diethyl carbonate (DEC), ethylmethyl carbonate (EMC), vinyl ethylene carbonate (VEC), dimethyl ethyl (DME) or other ethers such as tetrahydrofuran (THF), diglyme (diethylene glycol dimethyl ether), triglyme (triethylene glycol dimethyl ether), or a mixture of any two or more thereof. In specific embodiments, the solvent comprises a mixture of ethyl carbonate and ethylmethyl carbonate at a ratio of about 1:20 to about 20:1 by weight, for example, 1:1, about 2:1, or about 3:7 by weight. In other embodiments, the solvent comprises a mixture of two or more ether solvents, such as dimethyl ether, diglyme, triglyme, and tetrahydrofuran.

The solvent may be a non-aqueous ionic liquid. Examples of the ionic liquids include, but are not limited to, 1-butyl-3-methylimidazolium tetrafluoroborate (IMIBF$_4$), 1-butyl-3-methylimidazolium hexafluorophosphate (IMIPF$_6$), 1-butyl-4-methylpyridinium tetrafluoroborate (PyBF$_4$), N-methyl-N-propylpiperidinium bis(trifluoromethane sulfonyl) imide (PP13-TFSI), 1-ethyl-3-methlyimidazolium tetrafluoroborate (EMIBF$_4$) or a mixture of any two more thereof. In certain embodiments, the solvent is a combination of an aprotic solvent and a non-aqueous ionic liquid.

In some embodiments, the compound of Formula I is present in the catholyte at a concentration from about 0.001 M to about 5.0 M. In particular embodiments, the compound of Formula I is present in the catholyte at a concentration of about 0.01 M to about 1.0 M. In some embodiments, the compound of Formula I is present in the catholyte at a concentration from about 0.005 M to about 1.0 M, from about 0.01 M to about 0.9 M, from about 0.01 M to about 0.8 M, from about 0.01 M to about 0.7 M, from about 0.01 M to about 0.6 M, from about 0.01 M to about 0.5 M, from about 0.01 M to about 0.4 M, from about 0.01 M to about 0.3 M, from about 0.01 M to about 0.2 M, or from about 0.01 M to about 0.1 M. In some embodiments, the compound of Formula I is present in the catholyte at a concentration of from about 1 mM to about 50 mM, from about 1 mM to about 45 mM, from about 1 mM to about 40 mM, from about 1 mM to about 35 mM, from about 1 mM to about 30 mM, from about 1 mM to about 25 mM, from about 1 mM to about 20 mM, from about 5 mM to about 15 mM. In particular embodiments, the compound of Formula I is present in the catholyte at a concentration of about 5 mM, about 10 mM, about 15 mM, about 20 mM, about 30 mM, about 40 mM, about 50 mM, about 0.1 M, about 0.2 M, about 0.3 M, about 0.4 M, about 0.5 M, about 0.6 M, about 0.7 M, about 0.8 M, about 0.9 M, about 1.0 M, about 2.0 M, about 3.0 M, about 4.0 M, or about 5.0 M.

The redox flow battery includes a negative electrolyte chamber ("NE chamber") that contains the negative electrolyte (i.e., anolyte). The NE chamber is defined by a first housing or enclosure. The NE chamber is adapted to communicate with a first negative electrolyte reservoir ("NE reservoir") and a second NE reservoir (e.g., via openings, valves, tubing, and the like to connect the interior of the housing/enclosure with the interior of the reservoirs). The first NE reservoir, the NE chamber, and the second NE reservoir together define a negative electrolyte circulation pathway. A pump may be positioned within the anolyte circulation pathway to facilitate circulation of the anolyte back and forth between the first NE reservoir and the second NE reservoir over the negative electrode. The pump may be positioned in any convenient location in the anolyte flow pathway (e.g., between the first NE reservoir and the NE chamber, between the second NE reservoir and the NE chamber, or integral with a portion of the NE chamber or NE reservoirs). The negative electrode (i.e., anode) may comprise, consist essentially of, or consist of a metal (e.g., platinum, copper, aluminum, nickel or stainless steel), a carbon material (e.g., carbon black, activated carbon, amorphous carbon, graphite, graphene, or a nanostructured carbon material), lithium, sodium, magnesium, or a combination thereof. The electrode may be porous, fluted, or smooth.

The positive electrode of the battery is positioned within a positive electrolyte chamber ("PE chamber"), which contains the positive electrolyte (i.e., catholyte). The PE chamber is defined by a second housing or enclosure. The PE chamber is adapted to communicate with a first catholyte reservoir ("PE reservoir") and a second PE reservoir (e.g., via openings, valves, tubing, and the like to connect the interior of the housing/enclosure with the interior of the reservoirs). The first PE reservoir, the PE chamber, and the second PE reservoir together define a catholyte circulation pathway. A pump may be positioned within the catholyte circulation pathway to facilitate circulation of the catholyte back and forth between the first PE reservoir and the second PE reservoir over the positive electrode. The pump may be positioned in any convenient location in the catholyte flow pathway (e.g., between the first PE reservoir and the PE chamber, between the second PE reservoir and the PE chamber, or integral with a portion of the PE chamber or PE reservoirs). The positive electrode may comprise, consist essentially of, or consist of a metal (e.g., platinum, copper, aluminum, nickel or stainless steel), a carbon material (e.g., carbon black, activated carbon, amorphous carbon, graphite, graphene, or a nanostructured carbon material), lithium, sodium, magnesium, or a combination thereof. The electrode may be porous, fluted, or smooth.

Pumps suitable for use in the redox flow batteries described herein may include internal gear pumps, screw pumps, shuttle block pumps, flexible vane pumps, sliding vane pumps, circumferential piston pumps, helical twisted root pumps, piston pumps, diaphragm pumps, peristaltic pumps, centrifugal pumps, and the like, which are well known in the liquid pumping art. The utility of a given pump will be dependent on the chemical resistance of the pump to the electrolyte components in contact therewith (i.e., materials compatibility).

In some embodiments, the redox flow battery of the present technology includes a separator situated between the NE chamber and the PE chamber. The separator is adapted to allow cations to flow back and forth between the negative and positive electrolytes upon charging and discharging of the battery. In some embodiments, the separator may be, for example, a cation-permeable membrane, sheet, panel, or film that is permeable to the cations of the electrolytes. In some embodiments, the separator is at least partially impermeable to the redox components of the electrolytes.

In some embodiments, the first and second housings or enclosures for the electrodes are integral with one another, and the cation-permeable separator is mounted as an internal partition separating the NE chamber from the PE chamber. In other embodiments, the first and second housings may be separate components that include perforations or openings that contact the separator, such that cations can flow between the NE chamber and the PE chamber, optionally along with some of the solvent and or redox component, and the separate housings are sealed, e.g. by gaskets, around the partition.

Non-limiting examples of suitable separator materials include, NAFION® type ion exchange membranes (sulfonated tetrafluoroethylene-based fluoropolymer-copolymers), other porous polymeric materials such as, for example, sulfonated poly(ether ether ketones), polysulfones, polyethylene, polypropylene, ethylene-propylene copolymers, polyimides, polyvinyldifluorides, and the like, which may be in the form of membranes, matrix-supported gels, sheets, films, or panels. Other suitable materials include porous ceramics, porous insulated metals, cation-conducting glasses, and zeolites. Alternatively, the separator may be an interface between immiscible liquids. In such case, a porous film, panel, or mesh might be included to aid in maintaining separation between the liquids (e.g., as a physical support or guide to aid in maintaining laminar flow at the interface).

During charging of the battery, an electric potential is applied to the negative and positive electrodes, while simultaneously pumping the negative electrolyte (anolyte) over the negative electrode from the first NE reservoir to the second NE reservoir, and pumping the positive electrolyte (catholyte) over the positive electrode from the first PE reservoir to the second PE reservoir. Cations flow across the cation-permeable separator to balance the charges. The negative redox reactant is reduced and stored in the second NE reservoir, while the positive redox reactant is oxidized and stored in the second PE reservoir. In this way, energy may be stored by charging the battery from an energy source during off-peak usage periods.

During discharge, the electrodes are placed in a circuit (e.g., with a power grid) and the direction of electrolyte flow is reversed, with the stored reduced negative redox reactant being pumped over the negative electrode back into the first NE reservoir, and the stored oxidized positive redox reactant being pumped over the positive electrode back into the first PE reservoir. Cations again flow across the cation-permeable separator (in the opposite direction) to balance the charges. The energy stored in the system may thus be directly used to perform work or can be transferred back into the power grid during peak usage periods to supplement the power supply. An AC/DC converter may be used to facilitate transfer of energy to and from an AC power grid.

The redox flow battery may include additional redox active compounds. In specific embodiments, the compound of Formula I is present at a concentration greater than any additional redox active compound in the solvent.

The redox flow battery of the present technology may include an additional redox active compound in the catholyte or anolyte. In certain embodiments, the redox active compound in the anolyte is a quinoxaline compound (e.g., a quinoxaline compound bearing at least one electron-donating substituent), a dipyridyl ketone compound, a viologen compound (e.g., a bis-benzyl viologen salt, an ethyl viologen salt such as bis-ethyl viologen diperchlorate, and the like), or a benzophenone compound.

In some embodiments, the redox active compound of the positive electrolyte may have a redox potential which is higher than that of the redox potential of the redox active compound in the negative electrolyte.

The solvent in the redox flow battery of the present technology may further include an electrolyte salt. The electrolyte salt components of the anolyte and catholyte may be any electrochemically stable salt. The electrolytes may include a single salt or a combination of two or more salts. The cation component of the salt may be any monovalent (e.g., $Li^+$, $Na^+$, $Ag^+$, $Cu^+$, $NH_4^+$, and the like) or multivalent cation (e.g., $Mg^{2+}$, $Ca^{2+}$, $Cu^{2+}$, $Zn^{2+}$, and the like). In specific embodiments, the cation comprises an alkali metal ion, an alkaline earth metal ion, and/or an organic cation. In some embodiments, the electrolyte salts utilized in anolyte and catholyte are alkali metal salts (e.g., lithium salts or sodium salts). In some embodiments, the electrolyte salt is a lithium salt. In specific embodiments, the lithium salt is LiBr, LiI, LiSCN, LiBF$_4$, LiAlF$_4$, LiPF$_6$, LiAsF$_6$, LiClO$_4$, Li$_2$SO$_4$, LiB(Ph)$_4$, LiAlO$_2$, Li[N(FSO$_2$)$_2$], Li[SO$_3$CH$_3$], Li[BF$_3$(C$_2$F$_5$)], Li[PF$_3$(CF$_2$CF$_3$)$_3$], Li[B(C$_2$O$_4$)$_2$], Li[B(C$_2$O$_4$)F$_2$], Li[PF$_4$(C$_2$O$_4$)], Li[PF$_2$(C$_2$O$_4$)$_2$], Li[CF$_3$CO$_2$], Li[C$_2$F$_5$CO$_2$], Li[N(CF$_3$SO$_2$)$_2$], Li[C(SO$_2$CF$_3$)$_3$], Li[N(C$_2$F$_5$SO$_2$)$_2$], Li[CF$_3$SO$_3$], Li$_2$B$_{12}$X$_{12-n}$H$_n$, (Li$_2$B$_{10}$X$_{10-n'}$H$_{n'}$, Li$_2$S$_{x''}$, (LiS$_x$,R$^{30}$)$_y$, (LiSe$_x$,R$^{30}$)$_y$, or a lithium alkyl fluorophosphate; and wherein X is a halogen, n is an integer from 0 to 12, n' is an integer from 0 to 10, x'' is an integer from 1 to 20, y is an integer from 1 to 3, and R$^{30}$ is H, alkyl, alkenyl, aryl, ether, F, CF$_3$, COCF$_3$, SO$_2$CF$_3$, or SO$_2$F.

In some embodiments, the concentration of the electrolyte salt in the solvent is about 0.01 M to about 10 M, from about 0.05 M to about 5 M, or from about 0.1 M to about 5 M. In specific embodiments, the concentration of the electrolyte salt in the solvent is about 0.1 M, about 0.2 M, about 0.3 M, about 0.4 M, about 0.5 M, about 0.6 M, about 0.7 M, about 0.8 M, about 0.9 M, about 1.0 M, about 1.2 M, about 1.5 M, about 2.0 M, about 3.0 M, about 4.0 M, about 5.0 M, or about 10 M.

The present invention, thus generally described, will be understood more readily by reference to the following examples, which are provided by way of illustration and are not intended to be limiting of the present invention.

EXAMPLES

Example 1

Synthesis of 9,10-bis(2-methoxyethoxy)-1,2,3,4-tetrahydro-1,4-methanoanthracene (DMB-11). Scheme 1 illustrates the synthetic scheme for the synthesis of DMB-11.

Scheme 1:

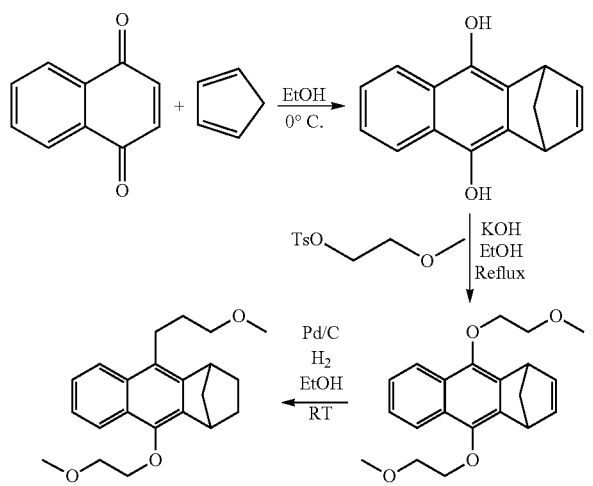

Fresh cyclopentadiene (6.0 g, 90.7 mmol) was added to a suspension of 1,4-naphthalenequinone (14.0 g, 88.5 mmol) in 150 mL of ethanol at 0° C. The reaction mixture was vigorously stirred at 0° C. for 3 hours before warming up to the room temperature ("RT"). A white precipitate was collected via filtration and rinsed with cold ethanol (25 mL) to yield 1,4-dihydro-1,4-methanoanthracene-9,10-diol (18.1 g, 90.7%).

To a solution of 1,4-dihydro-1,4-methanoanthracene-9,10-diol (2.4 g, 10.5 mmol), in 40 mL of ethanol, was added 4.6 mL of 10 M KOH$_{aq}$ solution followed by heating of the reaction mixture to reflux. 2-methoxyethyl-4-methylbenzenesulfonate (5.0 g, 20.9 mmol) was then added dropwise to the reaction mixture, and the progress of the reaction was monitored by GC-MS. Upon completion, the reaction mixture was allowed to cool to the room temperature, extracted with ethyl acetate, and dried over MgSO$_4$. The solvent was removed and 9,10-bis(2-methoxyethoxy)-1,4-dihydro-1,4-methanoanthracene (3.0 g, 84.0%) was collected as a white solid.

In the last step, a solution of 9,10-bis(2-methoxyethoxy)-1,4-dihydroanthracene (3.0 g, 8.82 mmol), in 150 mL of ethanol containing 10 wt % Pd/C, was hydrogenated under H$_2$ atmosphere at room temperature. Upon consumption of the starting material, the Pd/C catalyst was removed via filtration through a short pad of Celite, followed by rinsing with dichloromethane. The crude product was purified via flash chromatography on silica gel using ethyl acetate: hexane (1:9 v/v) as the eluent, followed by recrystallization from ethanol to yield DMB-11 (1.5 g, 49.7%) as a white solid.

$^1$H NMR of DMB-11 (300 MHz, CDCl$_3$, ppm): 8.15-8.12 (m, 2H), 7.44-7.41 (m, 2H), 4.31-4.20 (m, 2H), 4.19-4.13 (m, 2H), 3.82-3.77 (m, 6H), 3.52 (s, 6H), 2.03 (d, J=7.2 Hz, 2H), 1.78 (d, J=7.0 Hz, 1H), 1.61 (d, J=7.0 Hz, 1H), 1.37 (d, J=7.2 Hz, 2H). $^{13}$C NMR of DMB-11 (75 MHz, CDCl$_3$, ppm): 143.0, 136.2, 128.2, 124.9, 122.1, 73.3, 72.0, 59.2, 47.9, 40.5, 27.5.

Example 2

Synthesis of 9,10-bis(2-methoxyethoxy)-1,2,3,4-tetrahydro-1,4-ethanoanthracene (DMB-12). Scheme 2 illustrates the synthetic scheme for the synthesis of DMB-12.

Scheme 2:

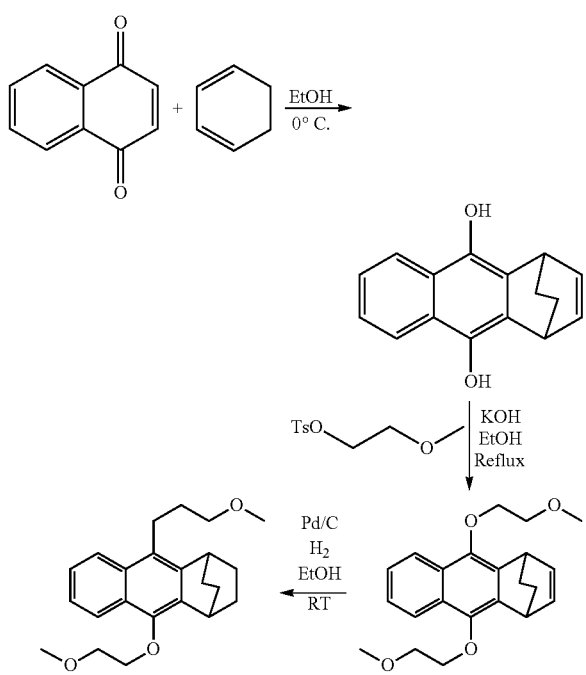

1,3-cyclohexadiene (12.0 g, 149.7 mmol) was added to a suspension of 1,4-naphthalenequinone (23.3 g, 147.3 mmol) in 200 mL of ethanol at 0° C. The reaction mixture was stirred vigorously at 0° C. for 5 hours prior to warming to room temperature. The white precipitate was collected via filtration and rinsed with cold ethanol (40 mL) to yield 1,4-dihydro-1,4-ethanoanthracene-9,10-diol (28.5 g, 79.8%).

To a solution of 1,4-dihydro-1,4-ethanoanthracene-9,10-diol (5.0 g, 20.9 mmol) in 50 mL of ethanol was added 9.2 mL of 10 M KOH aqueous solution, followed by heating to reflux. 2-methoxyethyl-4-methylbenzenesulfonate (12.5 g, 52.5 mmol) was then added dropwise to the reaction mixture and the reaction progress was monitored by GC-MS. Upon completion of the reaction, the reaction mixture was allowed to cool to room temperature, extracted with ethyl acetate, and dried over $MgSO_4$. The solvent was then removed and 9,10-bis(2-methoxyethoxy)-1,4-dihydro-1,4-ethanoanthracene (6.1 g, 81.6%) was collected as a white solid.

Finally, a solution of 9,10-bis(2-methoxyethoxy)-1,4-dihydro-4-ethanoanthracene (6.0 g, 16.9 mmol), in 150 mL of ethanol containing 10 wt % Pd/C, was hydrogenated under an $H_2$ atmosphere at the room temperature. Upon consumption of the starting material, the Pd/C catalyst was removed via filtration through a short pad of Celite followed by rinsing with dichloromethane. The crude product was purified via flash chromatography on silica gel using ethyl acetate:hexane (1:9, v/v) as the eluent, followed by recrystallization from ethanol to yield DMB-12 (2.3 g, 38.2%) as a white solid.

$^1$H NMR of DMB-12 (300 MHz, $CDCl_3$, ppm): 8.17-8.14 (m, 2H), 7.46-7.25 (m, 2H), 4.13-4.10 (m, 4H), 3.82-3.78 (m, 4H), 3.54-3.52 (m, 8H), 1.86 (d, J=7.2 Hz, 4H), 1.45 (d, J=7.5 Hz, 4H). $^{13}$C NMR of DMB-11 (75 MHz, $CDCl_3$, ppm): 144.6, 133.7, 127.4, 124.9, 122.1, 74.1, 71.9, 59.2, 27.0, 25.8.

Example 3

Cyclic voltammetry ("CV") of DMB-11. CV scans were obtained for DMB-11 in 0.5 M tetrabutylammonium hexafluorophosphate ($TBAPF_6$) in acetonitrile ("ACN") at various scan rates using a three electrode system (Pt working electrode, Pt counterelectrode, and a Ag/Ag$^+$ reference electrode). The results are presented in FIG. 1. Two redox couples are observed with redox potentials of 0.76 V and 1.18 V vs. Ag/Ag$^+$, respectively. In addition, the ratios of the anodic peak current to the cathodic peak current of these two redox couples are 0.9, indicating exceptional electrochemical reversibility for DMB-11.

Example 4

Figure 2:
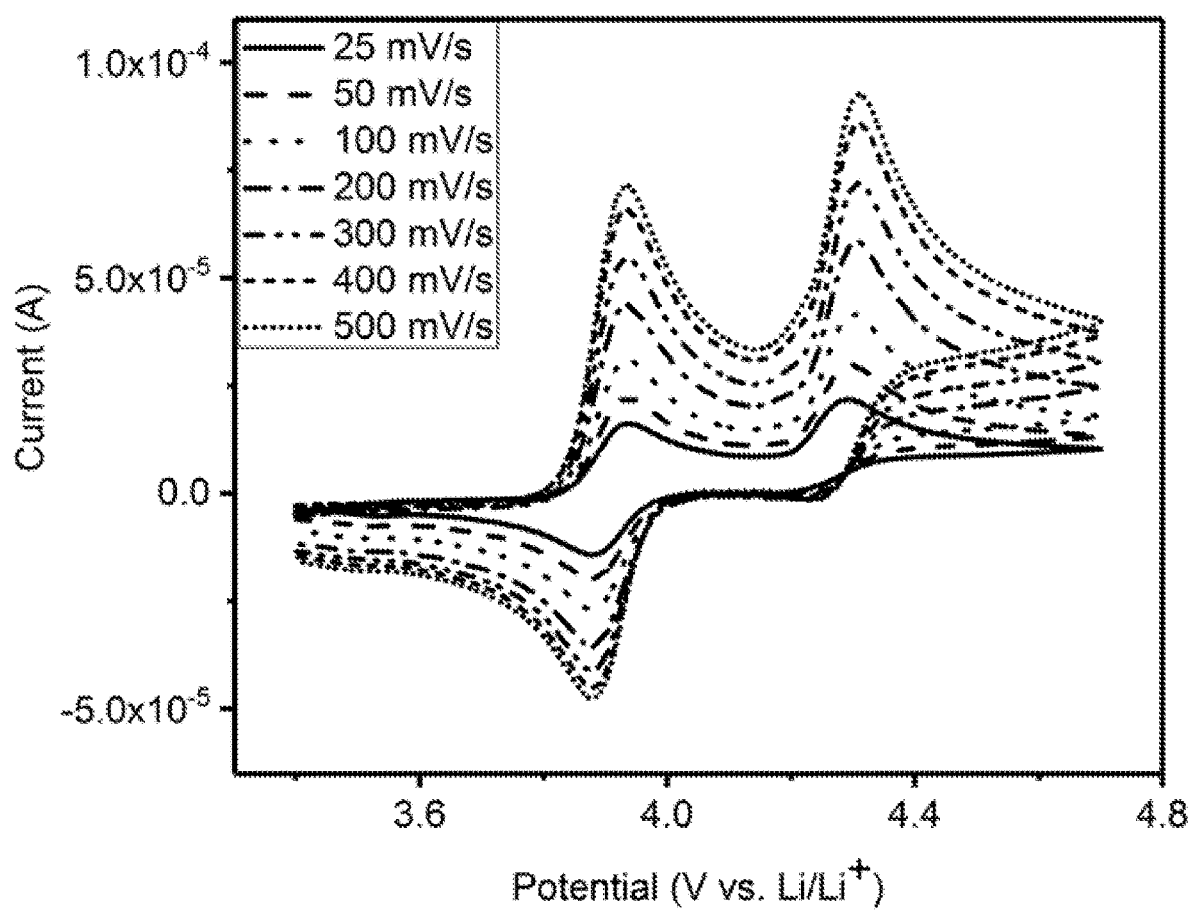
FIG. 2 illustrates a cyclic voltammogram of DMB-11 (10 mM) in an electrolyte of 1.2 M $LiPF_6$ in ethylene carbonate/ethylmethyl carbonate (3:7 by weight) at various scan rates, according to the examples.

CV scans of were also obtained for DMB-11 in an electrolyte of 1.2 M $LiPF_6$ in ethylene carbonate/ethylmethyl carbonate (3:7 by weight) the three electrode system (Pt working electrode, Li counterelectrode, and a Li reference electrode). The results are presented in FIG. 2. Two redox couples were observed with redox potentials of 3.90 V and 4.27 V vs Li/Li$^+$, respectively. It is worth noting that the second redox couple demonstrates quasi-reversibility in the electrolyte, which could be ascribed to the slowing of the reduction reaction due to the stabilization of the starting material by highly polar solvents.

Example 5

Figure 3:
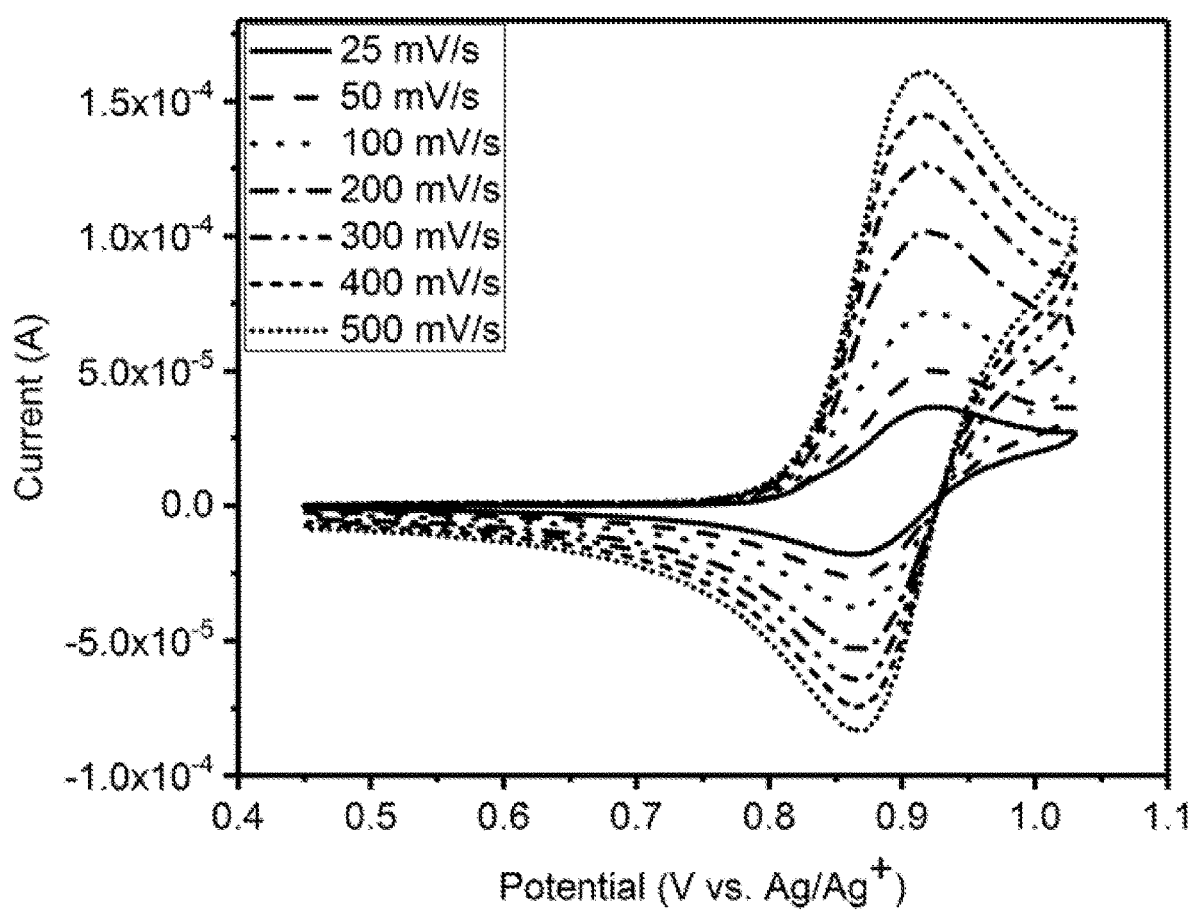
FIG. 3 illustrates CV scans for DMB-12 in 0.5 M $TBAPF_6$ in acetonitrile at various scan rates, according to the examples.

Cyclic voltammetry of DMB-12. CV scans were obtained for DMB-12 in 0.5 M $TBAPF_6$ in ACN at various scan rates using a three electrode system (Pt working electrode, Pt counterelectrode, and a Ag/Ag$^+$ reference electrode). The results are presented in FIG. 3. A single redox couple is observed for DMB-12 with a redox potential of 0.89 V vs. Ag/Ag$^+$. The ratio of the anodic peak current to the cathodic peak current of this redox couple is about 0.5, indicating a compromised electrochemical reversibility. The reversibility of DMB-12 is consistent with our observations in the hydroquinone ethers with the same bicyclic substituents. We attribute this interesting phenomenon to the hampered conformational transition of the alkoxy groups at 9- and 10-positions during redox, which is the result of greater steric hindrance of the bulkier bicyclo[2,2,2]heptane group in comparison to the bicyclo[2,2,1]pentane counterpart.

Example 6

Figure 4:
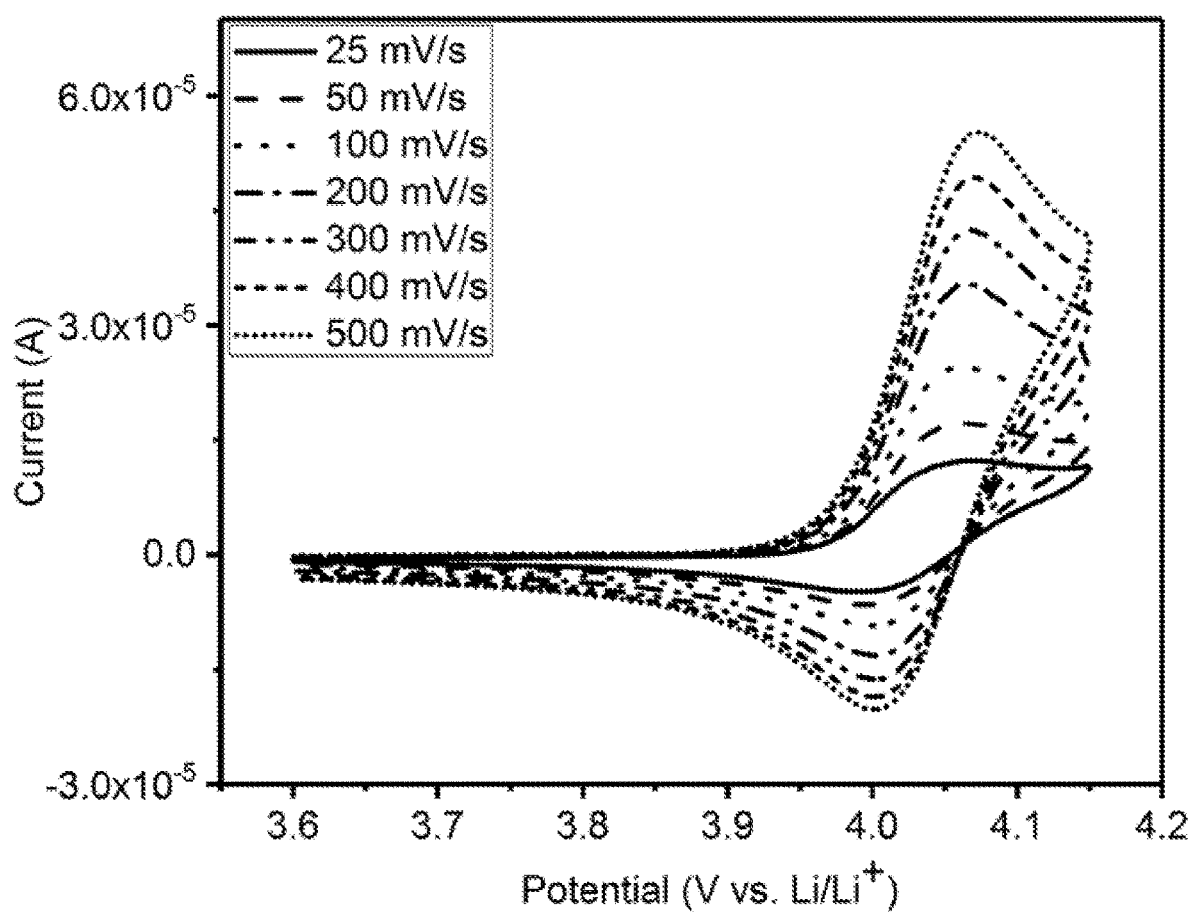
FIG. 4 illustrates a cyclic voltammogram of DMB-12 (10 mM) in an electrolyte of 1.2 M $LiPF_6$ in ethylene carbonate/ethylmethyl carbonate (3:7 by weight) at various scan rates, according to the examples.

CV scans of were also obtained for DMB-12 in an electrolyte of 1.2 M $LiPF_6$ in ethylene carbonate/ethylmethyl carbonate (3:7 by weight) using the three electrode system (Pt working electrode, Li counterelectrode, and a Li reference electrode). The results are shown in FIG. 4. As will be noted, only a single reversible redox couple was observed at 4.04 V vs Li/Li$^+$.

Example 7

Figure 5A:
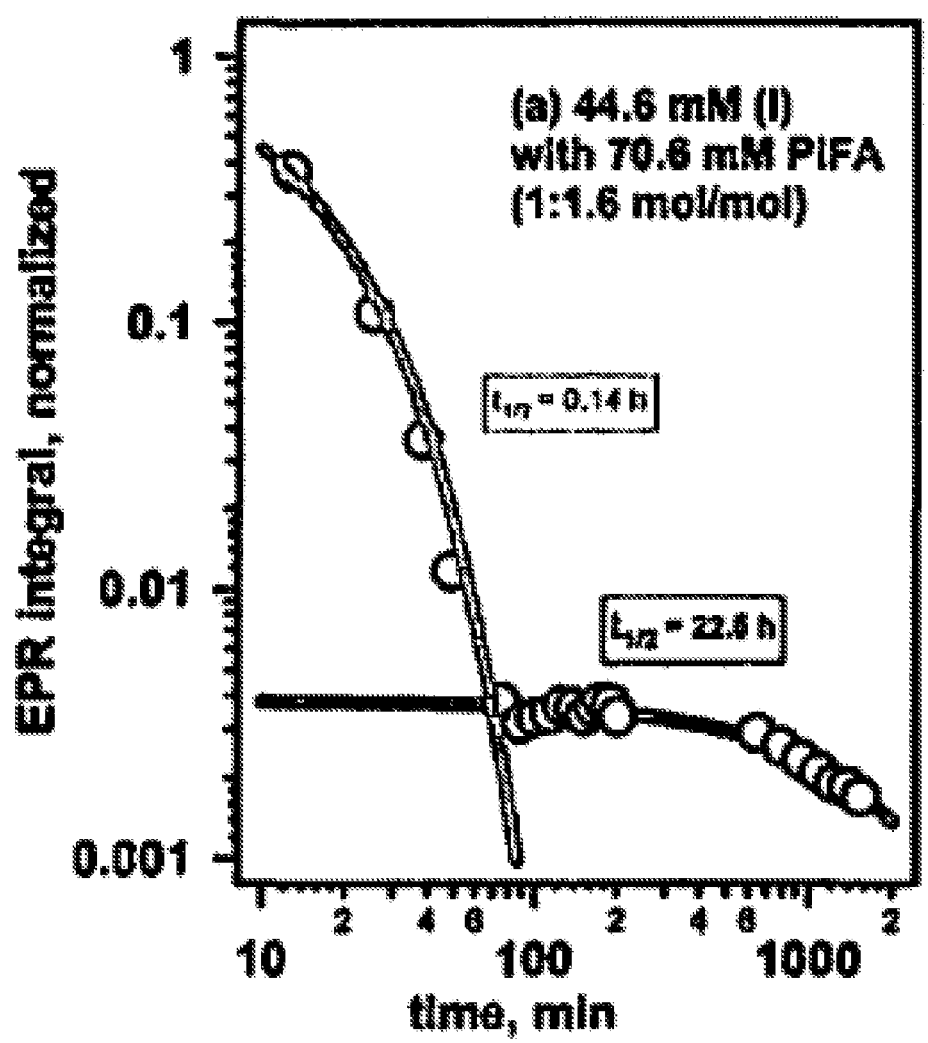
FIG. 5A illustrates the decay kinetics of chemically generated radical cation of 1,4-dimethoxynaphthalene and DMB-11, according to the examples.
Figure 5B:
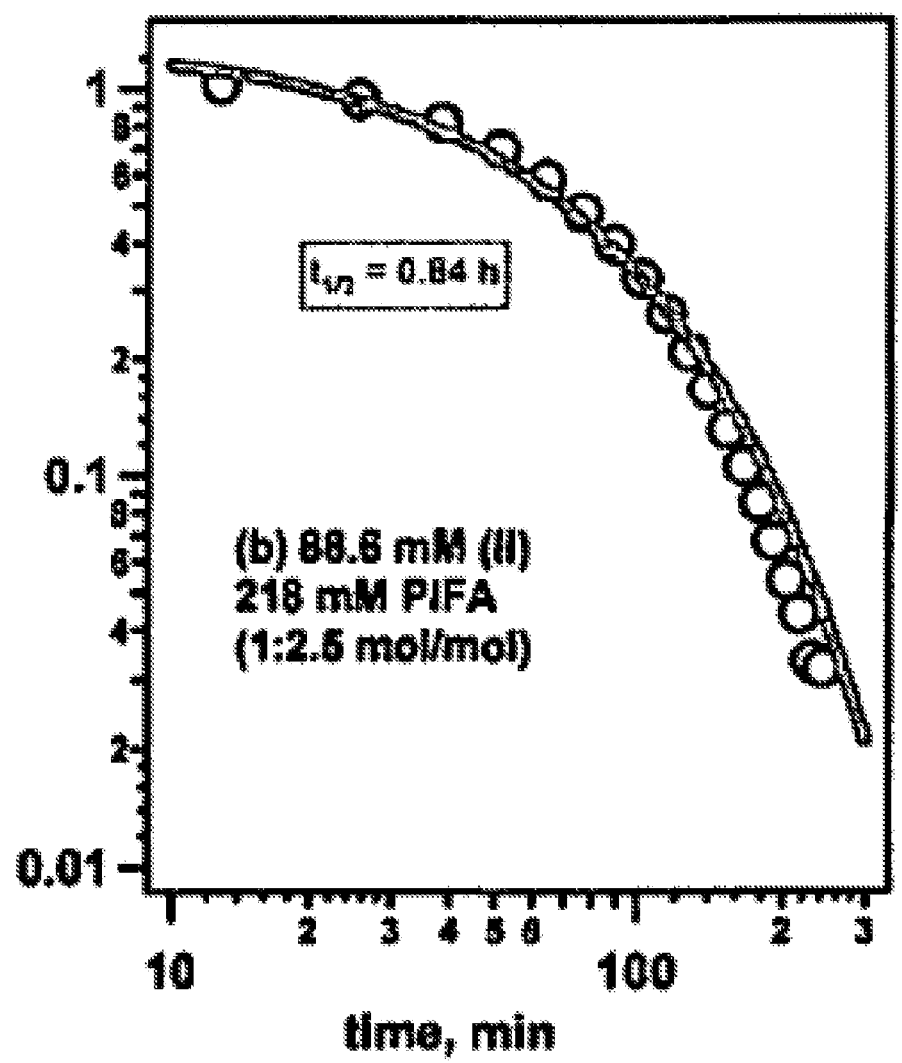
FIG. 5B illustrates the decay kinetics of chemically generated radical cation DMB-11, according to the examples.

FIG. 5 illustrates the decay kinetics (open circles) for radical cations of (A) 1,4-dimethoxynaphthalene (DMN) and (B) DMB-11 after chemical oxidation of their progenitors by [bis(trifluoroacetoxy)iodo]-benzene (PIFA) in nitrogen-saturated dichloromethane at 25° C. The concentrations and mole ratios are given in the figure. The relative concentrations of the radical cations were obtained by double integration of the continuous-wave Electron Paramagnetic Resonance (EPR) spectra obtained in the X-band. The solid lines represent first-order kinetic fits. The decay half-times are given in the panels. The monomer radical cation of 1,4-dimethoxynaphthalene (a) forms a more stable it-stack sandwich dimer radical cation with the neutral progenitor, in which the spin and charge density are divided equally between the two molecules. The fast trace corresponds to the decay of the monomer radical cation and approaching the equilibrium between the monomer and the dimer; the slower trace corresponds to the slow decay of the dimer radical cation. DMB-11 has a radical cation half-life of 6 times that of the unprotected counterpart, indicating the excellent stabilization effect of the bicyclo[2,2,1]pentane protecting group.

TABLE 1

Redox Flow Battery-related properties of DMB-11, DMB-12, DMN, and DBBB.

| Compound | Redox Potential (V v. Li/Li$^+$) | MW/electron (g/mol) | Intrinsic Capacity (mAh/g) | Energy Density (Wh/kg) |
| --- | --- | --- | --- | --- |
| DMB-11 | 3.90, 4.27 | 170.20 | 157.49 | 643.35 |
| DMB-12 | 4.04 | 356.46 | 75.20 | 303.81 |
| DMN | 3.87, 4.43 | 94.11 | 287.83 | 1182.04 |
| DBBB | 4.05 | 338.49 | 79.19 | 320.72 |

Table 1 summarizes the redox potentials (vs Ag/Ag$^+$), molecular weight per electron, intrinsic capacity, and energy density of DMB-11, DMB-12, DMN, and 2,5-di-tert-butyl-1,4-bis(2-methoxyethoxy)benzene ("DBBB"). Despite the minimal structural difference between DMB-11 and DMB- 12, the two-electron redox DMB-11 illustrates substantial advantages over the one-electron redox DMB-12 in almost every RFB-related property. In light of the similar molecular weight, DMB-11 has a mass per electron about half of that of DMB-12, leading to a doubled intrinsic capacity and energy density without any compromise in the redox potential. Such superiority of DMB-11 used as the catholyte of RFBs retains in comparison to DBBB, one of the most successful one-electron redox catholyte materials with nearly identical mass to DMB-11. On the other hand, in the context of two-electron redox species, DMB-11 has an intrinsic capacity and energy density slightly more than half of that of DMN. Here it is worth noting that DMN has no structural optimization such as solubilizers or protecting groups that would improve its compatibility and performance in RFBs. To be more specific, if two 2-methoxyethoxy solubilizers were introduced to DMN, the intrinsic capacity and energy density of DMB-11 would over 75% of that of the modified DMN counterpart. In terms of redox potential, the bicyclo[2,2,1]pentane moiety shows only marginal influences.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A redox flow battery comprising a two-electron, redox active, bridged, multi-cyclic compound (TRBMC) represented by Formula I:

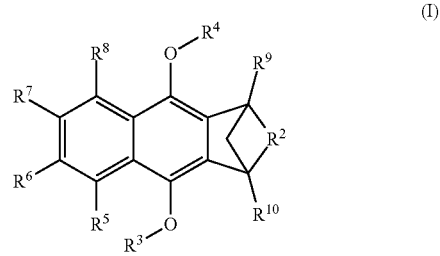

wherein:
$R^2$ is a bond or alkylene;
$R^3$ and $R^4$ are individually H, alkyl, haloalkyl, phosphate, $-[(CH_2)_n-O]_{n'}-R^{11}$;
$R^5$, $R^6$, $R^7$, and $R^8$ are individually H, alkyl, haloalkyl, alkenyl, F, Cl, Br, I, $NO_2$, CN, $-[(CH_2)_n-O]_{n'}-R^{11}$, aryl, aralkyl, or where any two may join together to form an aromatic or non-aromatic fused ring;
$R^9$ and $R^{18}$ are individually H, alkyl, F, Cl, Br, I, $NO_2$, CN, aryl, or aralkyl;
each $R^{11}$ is individually H, alkyl, aryl, or aralkyl;
n is an integer from 0 to 25; and
n' is an integer from 0 to 25.

2. The redox flow battery of claim 1, wherein the TRBMC comprises an annulated anthracene ether compound.

3. The redox flow battery of claim 1, wherein $R^2$ is $C_1$-$C_4$-alkylene.

4. The redox flow battery of claim 3, wherein $R^2$ is methylene, ethylene, n-propylene, or iso-propylene.

5. The redox flow battery of claim 1, wherein $R^2$ is ethylene.

6. The redox flow battery of claim 1, wherein $R^3$ and $R^4$ are individually H, alkyl, or $-[(CH_2)_n-O]_{n'}-R^{11}$.

7. The redox flow battery of claim 1, wherein $R^5$, $R^6$, $R^7$, and $R^8$ are individually H or alkyl, or where any two may join together to form a ring.

8. The redox flow battery of claim 1, wherein $R^9$ and $R^{10}$ are individually H or alkyl.

9. The redox flow battery of claim 1, wherein each $R^H$ is individually H or alkyl.

10. The redox flow battery of claim 1, wherein n is an integer from 1 to 10; and n' is an integer from 1 to 10.

11. The redox flow battery of claim 1, wherein:
$R^2$ is methylene or ethylene;
$R^3$ and $R^4$ are individually H, alkyl, or —[(CH$_2$)$_n$—O]$_{n'}$—$R^{11}$;
$R^5$, $R^6$, $R^7$, and $R^8$ are individually H;
$R^9$ and $R^{10}$ are individually H, methyl, ethyl, n-propyl, iso-propyl, n-butyl, sec-butyl, iso-butyl, or tert-butyl;
each $R^{11}$ is individually H or alkyl;
n is an integer from 1 to 10; and
n' is an integer from 1 to 10.

12. The redox flow battery of claim 1, wherein the TRBMC comprises 9,10-bis(2-methoxyethoxy)-1,2,3,4-tetrahydro-1,4-methanoanthracene.

13. The redox flow battery of claim 1 that is non-aqueous.

14. A method of operating a redox flow battery, the method comprising providing the redox flow battery of claim 1.

15. The method of claim 14, wherein the TRBMC comprises 9,10-bis(2-methoxyethoxy)-1,2,3,4-tetrahydro-1,4-methanoanthracene.

16. A redox flow battery comprising 9,10-bis(2-methoxyethoxy)-1,2,3,4-tetra hydro-1,4-ethanoanthracene.

17. A method of operating a redox flow battery, the method comprising providing the redox flow battery of claim 16.

* * * * *